US012129452B2

(12) United States Patent
Peera et al.

(10) Patent No.: US 12,129,452 B2
(45) **Date of Patent: *Oct. 29, 2024**

(54) POLYMER FOR CLEANING BOOSTING

(71) Applicants: Dow Global Technologies LLC, Midland, MI (US); Rohm and Haas Company, Collegeville, PA (US)

(72) Inventors: Asghar A. Peera, Royersford, PA (US); Stephen J. Donovan, Sellersville, PA (US); Roy Roberts, Bristol, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 409 days.

This patent is subject to a terminal disclaimer.

(21) Appl. No.: 17/605,013

(22) PCT Filed: May 28, 2020

(86) PCT No.: PCT/US2020/034804

§ 371 (c)(1),
(2) Date: Oct. 20, 2021

(87) PCT Pub. No.: WO2020/251765

PCT Pub. Date: Dec. 17, 2020

(65) Prior Publication Data

US 2022/0213414 A1 Jul. 7, 2022

Related U.S. Application Data

(60) Provisional application No. 62/861,473, filed on Jun. 14, 2019.

(51) Int. Cl.
*C11D 3/37* (2006.01)
*C11D 17/00* (2006.01)

(52) U.S. Cl.
CPC ............ *C11D 3/378* (2013.01); *C11D 3/3753* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 9,771,547 | B2 | 9/2017 | Hulskotter et al. | |
| 2005/0245428 | A1 | 11/2005 | Rodrigues et al. | |
| 2009/0005288 | A1 | 1/2009 | Boutique et al. | |
| 2011/0245132 | A1* | 10/2011 | Dupont | C08F 216/14 510/357 |
| 2013/0171210 | A1 | 7/2013 | Baker et al. | |
| 2014/0371126 | A1 | 12/2014 | Rodrigues et al. | |
| 2015/0329479 | A1 | 11/2015 | Ma et al. | |
| 2016/0090552 | A1 | 3/2016 | Loughnane et al. | |
| 2016/0312152 | A1 | 10/2016 | Borne et al. | |
| 2017/0226371 | A1* | 8/2017 | Deshpande | C09D 133/14 |
| 2017/0309916 | A1* | 10/2017 | Toyoda | H01M 4/622 |
| 2019/0284463 | A1* | 9/2019 | Mazard | C09K 8/32 |

FOREIGN PATENT DOCUMENTS

| | | |
|---|---|---|
| EP | 3197995 | 8/2017 |
| JP | 10273351 | 10/1998 |
| WO | 2014009408 | 1/2014 |
| WO | 2014032269 | 3/2014 |
| WO | 2016045026 | 3/2016 |
| WO | 2016048969 | 3/2016 |
| WO | WO-2019092036 A1 * | 5/2019 |

* cited by examiner

*Primary Examiner* — Lorna M Douyon
(74) *Attorney, Agent, or Firm* — Thomas S. Deibert

(57) ABSTRACT

A liquid laundry additive is provided, comprising a cleaning booster polymer having structural units of a monoethylenically unsaturated carboxylic acid monomer; structural units of an ethylenically unsaturated monomer of formula (I)

(I)

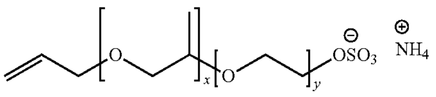

wherein x is an average of 0 to 20, wherein y is an average of 0 to 30 and wherein x+y is at least 1; and,
optionally, structural units of an ethylenically unsaturated monomer of formula (II)

(II)

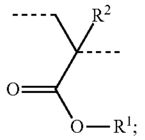

wherein $R^1$ is independently selected from a —$C_{1-4}$ alkyl, and wherein $R^2$ is independently selected from H and methyl.

10 Claims, No Drawings

POLYMER FOR CLEANING BOOSTING

The present invention relates to a liquid laundry additive. In particular, the present invention relates to a liquid laundry additive, comprising a cleaning booster polymer having structural units of a monoethylenically unsaturated carboxylic acid monomer; structural units of an ethylenically unsaturated monomer of formula (I)

(I)

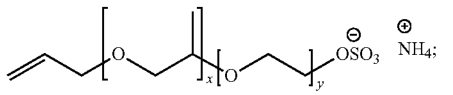

and, optionally, structural units of an ethylenically unsaturated monomer of formula (II)

(II)

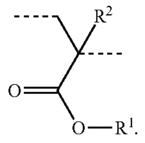

Laundry detergents in liquid and gel forms providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for liquid laundry additives that facilitate maintained primary cleaning performance with reduced surfactant loading in liquid or gel laundry detergent formulations; preferably, while also providing improved anti-redeposition performance.

The present invention provides a liquid laundry additive, comprising: a cleaning booster polymer, comprising: (a) 50 to 95 wt %, based on dry weight of the cleaning booster polymer, of structural units of a monoethylenically unsaturated carboxylic acid monomer; (b) 5 to 50 wt %, based on dry weight of the cleaning booster polymer, of structural units of an ethylenically unsaturated monomer of formula (I)

(I)

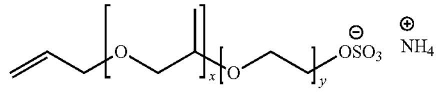

wherein x is an average of 0 to 20; wherein y is an average of 0 to 30 and wherein x+y≥1; and (c) 0 to 25 wt %, based on dry weight of the cleaning booster polymer, of structural units of an ethylenically unsaturated monomer of formula (II)

(II)

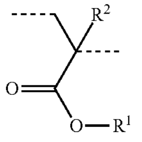

wherein each $R^1$ is independently selected from a $-C_{1-4}$ alkyl group; and wherein each $R^2$ is independently selected from the group consisting of a hydrogen and a methyl group.

DETAILED DESCRIPTION

It has been surprisingly found that the liquid laundry additive as described herein facilitates an improvement in primary cleaning performance for dust sebum, while maintaining good anti-redeposition performance for ground clay.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

The term "structural units" as used herein and in the appended claims refers to the remnant of the indicated monomer; thus a structural unit of (meth)acrylic acid is illustrated:

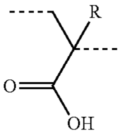

wherein the dotted lines represent the points of attachment to the polymer backbone and where R is a hydrogen for structural units of acrylic acid and a $-CH_3$ group for structural units of methacrylic acid.

Preferably, the liquid laundry additive of the present invention, comprises a cleaning booster polymer as described herein. More preferably, the liquid laundry additive of the present invention, comprises: water and a cleaning booster polymer as described herein; wherein the cleaning booster is dispersed in the water. Most preferably, the liquid laundry additive of the present invention, comprises: 5 to 85 wt % (preferably, 20 to 80 wt %; more preferably, 30 to 75 wt %; most preferably, 40 to 60 wt %) water and 15 to 95 wt % (preferably, 20 to 80 wt %; more preferably, 25 to 70 wt %; most preferably, 40 to 60 wt %) of a cleaning booster polymer as described herein.

Preferably, the cleaning booster polymer of the present invention comprises: (a) 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; (b) 5 to 50 wt % (preferably, 8 to 40 wt %; more preferably, 10 to 30 wt %; most preferably, 15 to 25 wt %), based on dry weight of the cleaning booster polymer, of structural units of an ethylenically unsaturated monomer of formula (I)

(I)

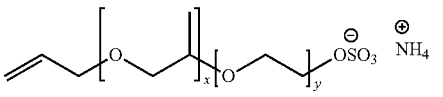

wherein x is an average of 0 to 20 (preferably, 0 to 15; more preferably, 0 to 10; most preferably, 2 to 6); wherein y is an average of 0 to 30 (preferably, 0 to 25; more preferably, 4 to 20; most preferably, 8 to 12) and wherein x+y≥1; and (c) 0 to 25 wt % (preferably, 0 to 20 wt %; more preferably, 5 to 15 wt %; most preferably, 8 to 13 wt %), based on dry weight of the cleaning booster polymer, of structural units of an ethylenically unsaturated monomer of formula (II)

(II)

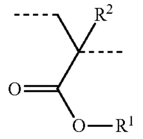

wherein each $R^1$ is independently selected from a $—C_{1-4}$ alkyl group; and wherein each $R^2$ is independently selected from the group consisting of a hydrogen and a methyl group.

Preferably, the cleaning booster polymer of the present invention has a weight average molecular weight, $M_W$, of 500 to 100,000 Daltons (preferably, 2,000 to 50,000 Daltons; more preferably, 2,500 to 20,000 Daltons; most preferably, 4,000 to 10,000 Daltons).

Preferably, the cleaning booster polymer of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer. More preferably, the cleaning booster polymer of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid monomer is selected from monoethylenically unsaturated monomers that contain at least one carboxylic acid group. Still more preferably, the cleaning booster polymer of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid monomer is selected from the group consisting of (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate, and other derivatives such as corresponding anhydride, amides, and esters. Yet still more preferably, the cleaning booster polymer of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid monomer is selected from the group consisting of acrylic acid, methacrylic acid and mixtures thereof. Still yet more preferably, the cleaning booster polymer of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid core monomer includes acrylic acid. Most preferably, the cleaning booster polymer of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid core monomer is acrylic acid.

Preferably, the cleaning booster polymer of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the structural units of the monoethylenically unsaturated carboxylic acid monomer are structural units of formula (III)

(III)

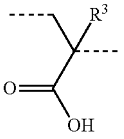

wherein each $R^3$ is independently selected from a hydrogen and a $—CH_3$ group (preferably, a hydrogen). Most preferably, the cleaning booster polymer of the present invention, comprises: 50 to 95 wt % (preferably, 55 to 85 wt %; more preferably, 60 to 82 wt %; most preferably, 62 to 70 wt %), based on dry weight of the cleaning booster polymer, of structural unites of a monoethylenically unsaturated carboxylic acid monomer; wherein the structural units of the monoethylenically unsaturated monocarboxylic acid monomer are structural units of formula (III), wherein each $R^3$ is independently selected from a hydrogen and a $—CH_3$ group; wherein $R^3$ is a hydrogen in 50 to 100 mol % (preferably, 75 to 100 mol %; more preferably, 90 to 100 mol %; still more preferably, 98 to 100 mol %; most preferably, 100 mol %) of the structural units of formula (III) in the cleaning booster polymer.

Preferably, the cleaning booster polymer of the present invention comprises: 5 to 50 wt % (preferably, 8 to 40 wt %; more preferably, 10 to 30 wt %; most preferably, 15 to 25 wt %), based on dry weight of the cleaning booster polymer, of structural units of an ethylenically unsaturated monomer of formula (I)

(I)

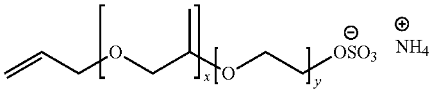

wherein x is an average of 0 to 20 (preferably, 0 to 15; more preferably, 0 to 10; most preferably, 2 to 6); wherein y is an average of 0 to 30 (preferably, 0 to 25; more preferably, 4 to 20; most preferably, 8 to 12) and wherein x+y≥1.

Preferably, the cleaning booster polymer of the present invention comprises: 0 to 25 wt % (preferably, 0 to 20 wt %; more preferably, 5 to 15 wt %; most preferably, 8 to 13 wt %), based on dry weight of the cleaning booster polymer, of structural units of an ethylenically unsaturated monomer of formula (II)

(II)

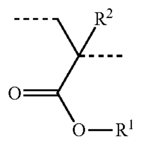

wherein each $R^1$ is independently selected from a —$C_{1-4}$ alkyl group (preferably, a methyl group, an ethyl group and a butyl group; more preferably, an ethyl group and a butyl group; most preferably, an ethyl group) and wherein each $R^2$ is independently selected from the group consisting of a hydrogen and a methyl group (preferably, a hydrogen). More preferably, the cleaning booster polymer of the present invention comprises: 0 to 25 wt % (preferably, 0 to 20 wt %; more preferably, 5 to 15 wt %; most preferably, 8 to 13 wt %), based on dry weight of the cleaning booster polymer, of structural units of an ethylenically unsaturated monomer of formula (II), wherein $R^1$ is an ethyl group in 75 to 100 mol % (preferably, 90 to 100 mol %; more preferably, 98 to 100 mol %; most preferably, 100 mol %) of the structural units of formula (II) in the cleaning booster polymer and wherein $R^2$ is a hydrogen in 75 to 100 mol % (preferably, 90 to 100 mol %; more preferably, 98 to 100 mol %; most preferably, 100 mol %) of the structural units of formula (II) in the cleaning booster polymer.

Preferably, the cleaning booster polymer of the present invention contains <1 wt % (preferably, <0.5 wt %; more preferably, <0.2 wt %; still more preferably, <0.1 wt %; yet still more preferably, <0.01 wt %; most preferably, < the detectable limit), based on the dry weight of the liquid laundry additive, of a vinyl alcohol polymer (PVA). More preferably, the cleaning booster polymer of the present invention contains <1 wt % (preferably, <0.5 wt %; more preferably, <0.2 wt %; still more preferably, <0.1 wt %; yet still more preferably, <0.01 wt %; most preferably, < the detectable limit), based on the dry weight of the liquid laundry additive, of a vinyl alcohol polymer (PVA); wherein the vinyl alcohol polymer has a degree of saponification of 80 to 100 mol % (determined using the method specified in JIS K 6726 (1994)). Most preferably, the cleaning booster polymer of the present invention contains <1 wt % (preferably, <0.5 wt %; more preferably, <0.2 wt %; still more preferably, <0.1 wt %; yet still more preferably, <0.01 wt %; most preferably, < the detectable limit), based on the dry weight of the liquid laundry additive, of a vinyl alcohol polymer (PVA); wherein the vinyl alcohol polymer may include modified vinyl alcohol polymer. Modified vinyl alcohol polymer includes anion-modified PVA (e.g., sulfonic acid group modified PVA and carboxylic acid group-modified PVA); cation-modified PVA (e.g., quaternary amine group-modified PVA); amide-modified PVA; acetoacetyl group-modified PVAs; diacetone acrylamide-modified PVA and ethylene-modified PVA.

Some embodiments of the present invention will now be described in detail in the following Examples.

Synthesis S1: Polymer 1

A two liter round bottom flask, equipped with a mechanical stirrer, heating mantle, thermocouple, condenser and inlets for the addition of monomer(s), initiator and chain regulator was charged with deionized water (206.25 g). The flask contents were set to stir and heated to 72° C. Once the flask contents reached reaction temperature of 72° C., a 0.15% aqueous iron sulfate heptahydrate promoter solution (2.5 g) was added, followed by the addition of sodium metabisulfite (SMBS) (0.89 g) dissolved in deionized water (5.25 g) as a pre-charge. Then, separate feeds were made to the flask contents, as follows:

Initiator co-feed: sodium persulfate (1.3 g) dissolved in deionized water (30 g) was fed to the flask over 95 minutes.

Chain Transfer Agent (CTA) co-feed: sodium metabisulfite (20.86 g) dissolved in deionized water (60 g) was fed to the flask over 80 minutes.

Monomer co-feed: A monomer solution containing glacial acrylic acid (240 g) and an ethylenically unsaturated monomer of formula (I), wherein x is 4 and y is 10 (available from Clariant as Emulsogen® APS-100)(60 g) was fed to the flask over 90 minutes.

Upon completion of the co-feeds, deionized water (15 g) was added as rinse. The flask contents were then held for at 72° C. for 10 minutes. At the completion of the hold, two sequential chase solutions were added to the flask with a 5 minute hold between the chase additions. Both chases comprised sodium persulfate (0.39 g) and deionized water (8 g) and were added over 10 minutes. After the second chase addition, the flask contents were then held at 72° C. for 20 minutes. At the completion of the final hold the flask contents were cooled to below 50° C. Then a 50% aqueous sodium hydroxide solution (100 g) was added to the flask slowly through an addition funnel while maintaining the temperature below 60° C. After addition of the aqueous sodium hydroxide solution, a 35% aqueous hydrogen peroxide scavenger solution (4 g) was added to the flask contents. With no residual bisulfite detected, a 50% aqueous sodium hydroxide solution (88 g) was added to the flask contents, keeping the temperature below 70° C. A final rinse of deionized water (15 g) was added through the addition funnel to the flask contents. The flask contents were then cooled to <35° C. The product polymer had a solids content of 45.0%, pH was 6.02, Brookfield viscosity of 2,340 cps. Residual monomer measured at below 50 ppm. Final weight average molecular weight, $M_w$, as measured by Gel Permeation Chromatography was 8,363 Daltons.

Synthesis S2: Polymer 2

A two liter round bottom flask, equipped with a mechanical stirrer, heating mantle, thermocouple, condenser and inlets for the addition of monomer(s), initiator and chain regulator was charged with deionized water (210 g). The flask contents were set to stir and heated to 72° C. Once the flask contents reached reaction temperature of 72° C., a 0.15% aqueous iron sulfate heptahydrate promoter solution (5.12 g) was added, followed by the addition of sodium metabisulfite (SMBS) (1.02 g) dissolved in deionized water (5.0 g) as a pre-charge. Then, separate feeds were made to the flask contents, as follows:

Initiator co-feed: sodium persulfate (1.92 g) dissolved in deionized water (25 g) was fed to the flask over 115 minutes.

Chain Transfer Agent (CTA) co-feed: sodium metabisulfite (23.14 g) dissolved in deionized water (45 g) was fed to the flask over 100 minutes.

Monomer co-feed: A monomer solution containing glacial acrylic acid (196.2 g), ethyl acrylate (EA) (33.6 g) and an ethylenically unsaturated monomer of formula (I), wherein x is 4 and y is 10 (available from Clariant as Emulsogen® APS-100)(70.2 g) was fed to the flask over 110 minutes.

Upon completion of the co-feeds, deionized water (15 g) was added as rinse. The flask contents were then held for at 72° C. for 10 minutes. At the completion of the hold, two sequential chase solutions were added to the flask with a 5 minute hold between the chase additions. Both chases comprised sodium persulfate (1.1 g) and deionized water (20 g) and were added over 10 minutes. After the second chase addition, the flask contents were then held at 72° C. for 20 minutes. At the completion of the final hold a 35% aqueous hydrogen peroxide scavenger solution (3.3 g) was added to the flask contents. Then a final rinse of deionized water (179 g) was added through the addition funnel to the flask contents. The flask contents were then cooled to <35° C. The product polymer had a solids content of 37.8%, pH was 2.51, Brookfield viscosity of 80 cps. Residual monomer measured at below 55 ppm. Final weight average molecular weight, $M_w$, as measured by Gel Permeation Chromatography was 5,880 Daltons.

Comparative Examples C1-C2 and Examples 1-2: Liquid Laundry Detergent

The liquid laundry detergent formulations used in the cleaning tests in the subsequent Examples were prepared having the generic formulation as described in Table 1 with the cleaning booster polymer as noted in Table 2 and were prepared by standard liquid laundry formulation preparation procedures.

TABLE 1

| Ingredient | Commercial Name | wt % |
|---|---|---|
| Linear alkyl benzene sulfonate | Nacconal 90G* | 8.0 |
| Sodium lauryl ethoxysulfate | Steol CS-460* | 2.0 |
| Non-ionic surfactant | Biosoft N25-7* | 4.0 |
| Cleaning Booster polymer | — | 3.0 |
| Deionized water | — | QS to 100 |

*available from Stepan Company

TABLE 2

| Example | Cleaning Booster Polymer |
|---|---|
| Comp. Ex. C1 | no cleaning booster polymer |
| Comparative Example C2 | ethoxylated poly(ethyleneimine)[2] |
| Ex. 1 | Synthesis S1: Polymer 1 |
| Ex. 2 | Synthesis S2: Polymer 2 |

[1]available from BASF under the tradename Sokolan™ HP-20

Primary Cleaning Performance

The primary cleaning performance of the liquid laundry detergent formulations of Comparative Examples C1-C2 and Examples 1-2 were assessed in a Terg-o-tometer Model TOM-52-A available from SR Lab Instruments (6×1 L wells) agitated at 90 cycles per minute with the conditions noted in Table 3.

TABLE 3

| Parameter | Setting |
|---|---|
| Temperature | 15° C. |
| Water hardness | 200 ppm, Ca/Mg = 2/1 |
| Fabric Types (3 in each well) | Stained Cotton 400 |
| Stains | Clay, Motor Oil and Dust Sebum (Bought from Scientific Services S/D, Inc.) |
| Wash time | 16 minutes |
| Rinse time | 3 minutes |
| Liquid laundry detergent dosage | 0.5 g/L |

The soil removal index (SRI) was calculated using ASTM Method D4265-14. The ΔSRI was determined in reference to a control detergent with the same surfactant concentrations absent cleaning booster. The results are provided in Table 4.

TABLE 4

| | Stain ΔSRI | | |
|---|---|---|---|
| Example | Ground Clay | Motor Oil | Dust Sebum |
| Comp. Ex. C2 | +8 | +5 | +1 |
| Ex. 1 | +6 | +4 | +2 |
| Ex. 2 | +7 | +1 | +3 |

Anti-Redeposition

The anti-redeposition performance of the Liquid laundry detergent formulations of Comparative Examples C1-C2 and Example 1 were assessed in a Terg-o-tometer Model 7243ES agitated at 90 cycles per minute with the conditions noted in Table 5.

TABLE 5

| Parameter | Setting |
|---|---|
| Temperature | 25° C. |
| Water hardness | 300 ppm, Ca/Mg = 2/1 |
| Fabric Types | Cotton Terry (CT) |
| | Cotton (C) |
| | Polyester: cotton blend (PB) |
| | Cotton interlock (CI) |

TABLE 5-continued

| Parameter | Setting |
|---|---|
| Wash time | 60 minutes |
| Rinse time | 3 minutes |
| Liquid laundry detergent dosage | 0.5 g/L |
| Anti-redeposition soils | 0.625 g/L Big Oak Clay (sourced locally from southeastern Pennsylvania)<br>2.5 g/L Body Sebum Emulsion (Scientific Services S/D Inc.) |

The fabrics were laundered for 5 consecutive cycles and the whiteness index was measured at 460 nm using a HunderLab UltraScan VIS Colorimeter to determine fabric whiteness in accordance with ASTM E313. The whiteness index for the neat unwashed fabrics was used as the positive control. The change in the whiteness index relative to the positive control for each of the liquid laundry formulations are provided in Table 6.

TABLE 6

| | Delta in Whiteness Index | | | |
|---|---|---|---|---|
| Example | CT | C | PB | CI |
| Comp. Ex. C1 | −74.53 | −26.60 | −43.84 | −24.77 |
| Comp. Ex. C2 | −56.11 | −17.61 | −35.18 | −14.95 |
| Ex. 1 | −60.74 | −11.71 | −29.68 | −8.56 |

We claim:

1. A liquid laundry additive, comprising:

a cleaning booster polymer, comprising:

(a) 50 to 95 wt %, based on dry weight of the cleaning booster polymer, of structural units of a monoethylenically unsaturated carboxylic acid monomer;

(b) 5 to 50 wt %, based on dry weight of the cleaning booster polymer, of structural units of an ethylenically unsaturated monomer of formula (I)

(I)

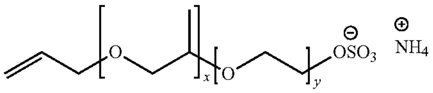

wherein x is an average of 0 to 20; wherein y is an average of 0 to 30 and wherein x+y≥1; and (c) 0 to 25 wt %, based on dry weight of the cleaning booster polymer, of structural units of an ethylenically unsaturated monomer of formula (II)

(II)

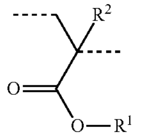

wherein each $R^1$ is independently selected from a —$C_{1-4}$ alkyl group; and wherein each $R^2$ is independently selected from the group consisting of a hydrogen and a methyl group.

2. The liquid laundry additive of claim 1, wherein the cleaning booster polymer has a weight average molecular weight, $M_w$, of 500 to 100,000 Daltons.

3. The liquid laundry additive of claim 2, wherein the structural units of monoethylenically unsaturated carboxylic acid monomer are structural units of formula (III)

(III)

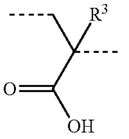

wherein each $R^3$ is independently selected from a hydrogen and a —$CH_3$ group.

4. The liquid laundry additive of claim 3, wherein $R^3$ is a hydrogen in 50 to 100 mol % of the structural units of formula (III) in the cleaning booster polymer.

5. The liquid laundry additive of claim 3, wherein $R^3$ is a hydrogen.

6. The liquid laundry additive of claim 5, wherein $R^1$ is an ethyl group and wherein $R^2$ is a hydrogen.

7. The liquid laundry additive of claim 6, wherein the cleaning booster polymer includes:

60 to 82 wt %, based on dry weight of the cleaning booster polymer, of structural units of the monoethylenically unsaturated carboxylic acid monomer;

10 to 30 wt %, based on dry weight of the cleaning booster polymer, of structural units of the ethylenically unsaturated monomer of formula (I); and 5 to 15 wt %, based on dry weight of the cleaning booster polymer, of structural units of the ethylenically unsaturated monomer of formula (II).

8. The liquid laundry additive of claim 7, wherein x is 2 to 6.

9. The liquid laundry additive of claim 8, wherein y is 8 to 12.

10. The liquid laundry additive of claim 9, wherein the liquid laundry additive contains ≤1 wt %, based on the dry weight of the liquid laundry additive, of a vinyl alcohol polymer.

* * * * *